United States Patent
Kobayashi (10) Patent No.: US 7,760,257 B2
(45) Date of Patent: Jul. 20, 2010

(54) IMAGE CAPTURING APPARATUS, CONTROL METHOD AND PROGRAM THEREOF, AND STORAGE MEDIUM

(75) Inventor: Taro Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1247 days.

(21) Appl. No.: 11/042,446

(22) Filed: Jan. 25, 2005

(65) Prior Publication Data

US 2005/0168610 A1    Aug. 4, 2005

(30) Foreign Application Priority Data

Jan. 30, 2004   (JP) ............................ 2004-024486

(51) Int. Cl.
*H04N 3/14* (2006.01)
*H04N 9/04* (2006.01)
(52) U.S. Cl. ..................... 348/294; 348/282; 250/201.2
(58) Field of Classification Search ................. 348/294, 348/282
See application file for complete search history.

(56) References Cited

U.S. PATENT DOCUMENTS

| | | | | |
|---|---|---|---|---|
| 5,589,880 | A * | 12/1996 | Tsukui .................... | 348/229.1 |
| 6,930,716 | B2 * | 8/2005 | Yoshida .................. | 348/322 |
| 7,079,184 | B2 * | 7/2006 | Yanai ..................... | 348/319 |
| 7,379,107 | B2 * | 5/2008 | Parks ...................... | 348/294 |
| 2002/0044206 | A1 * | 4/2002 | Kyuma et al. ........... | 348/240 |
| 2002/0167603 | A1 * | 11/2002 | Kato et al. .............. | 348/341 |
| 2003/0086005 | A1 * | 5/2003 | Nakamura .............. | 348/223.1 |

FOREIGN PATENT DOCUMENTS

| JP | 11-068515 | * | 3/1999 |
|---|---|---|---|
| JP | 2000-115643 | A | 4/2000 |
| JP | 2003-052049 | A | 2/2003 |

* cited by examiner

*Primary Examiner*—Sinh Tran
*Assistant Examiner*—Hung H Lam
(74) *Attorney, Agent, or Firm*—Cowan, Liebowitz & Latman, P.C.

(57) ABSTRACT

This invention has as its object to reduce the number of pixels to be read from an image sensor in accordance with a required image size and to shorten the time required to capture an image upon capturing a still image in an image capturing apparatus. To this end, this apparatus has an image sensor which comprises a plurality of photoelectric conversion pixels arranged in a two-dimensional matrix in the vertical and horizontal directions, and a common output unit which is commonly provided to the plurality of photoelectric conversion pixels to sequentially output signals from the plurality of photoelectric conversion pixels; and a read drive unit which can switch a first read mode for dividing signals of photoelectric conversion pixels from the image sensor into m fields (m is a natural number not less than 3) by interlaced scan, and reading signals for the m fields, and a second read mode for reading signals for n fields (n is a natural number that meets $2 \leq n < m$) of the m fields from the image sensor.

7 Claims, 11 Drawing Sheets

IMAGE CAPTURING APPARATUS, CONTROL METHOD AND PROGRAM THEREOF, AND STORAGE MEDIUM

FIELD OF THE INVENTION

The present invention relates to an image capturing apparatus which reads pixel signals from an image sensor, and records a still or moving image and, more particularly, to an apparatus having a mode of divisionally reading pixels of an image sensor by interlaced scan.

BACKGROUND OF THE INVENTION

In recent years, many digital still cameras which capture still or moving images using image sensors such as CCDs and the like have been developed. These cameras are required to have a multi-pixel structure as they have higher resolutions, higher degrees of freedom in edit, and the like, and the number of pixels of an image sensor is increasing accordingly.

However, the time required to transfer pixels from a photoelectric conversion unit in the order of a vertical transfer path→horizontal transfer path increases with increasing number of pixels, and the time required to capture one still image increases consequently.

For this reason, digital still cameras and the like with a multi-pixel structure are devised to increase the frame rate upon monitoring for field angle adjustment or upon sensing a moving image.

For example, a line decimated read mode is available. This read method improves the frame rate at the cost of the number of pixels/vertical resolution by reading one of every several lines.

As another example, a horizontal pixel addition function is available (e.g., Japanese Patent Laid-Open No. 2000-115643). This read method halves the number of pixels per line by adding every two pixels on an identical line in the horizontal transfer path. With this method, although the number of pixels is halved, the time required to transfer pixels per line can be halved.

Switching of these read methods is implemented by changing the drive timing of a CCD solid-state image sensor.

The conventional image capturing apparatus can improve the frame rate by a devise such as the line decimated read mode upon acquiring a moving image. However, such apparatus must read all pixels/all fields for a still image, and must adopt high-speed drive clocks to take measures against an increase in pixel read time due to the multi-pixel structure and deterioration of consecutive shooting performance accordingly.

When an output image size of the camera is small, a process that applies a signal process by reading pixels more than necessary, and reducing and outputting them in size is required, thus prolonging the time accordingly.

Along with an increase in number of pixels of an image sensor at present and in the future, an application that utilizes a feature of such element which reduces the file size using only a necessary and sufficient image size smaller than that obtained by reading full pixels in addition to a mode of reading all pixels of that image sensor of the camera may increase.

SUMMARY OF THE INVENTION

The present invention has been made in consideration of the above problems, and has as its object to shorten the time required to capture an image by reducing the number of pixels to be read from an image sensor in correspondence with a required image size upon capturing a still image in an image capturing apparatus.

In order to solve the above problems and to achieve the above object, according to the first aspect of the present invention, an image capturing apparatus is characterized by comprising: an image sensor which comprises a plurality of photoelectric conversion pixels arranged in a two-dimensional matrix in vertical and horizontal directions, and a common output unit which is commonly provided to the plurality of photoelectric conversion pixels to sequentially output signals from the plurality of photoelectric conversion pixels; and read unit which can switch a first read mode for dividing signals of photoelectric conversion pixels from the image sensor into m fields (m is a natural number not less than 3) by interlaced scan, and reading signals for the m fields, and a second read mode for reading signals for n fields (n is a natural number that meets $2 \leq n < m$) of the m fields from the image sensor.

According to the second aspect of the present invention, an image capturing apparatus is characterized by comprising: an image sensor which comprises a plurality of photoelectric conversion pixels arranged in a two-dimensional matrix in vertical and horizontal directions, and a common output unit which is commonly provided to the plurality of photoelectric conversion pixels to sequentially output signals from the plurality of photoelectric conversion pixels; and read unit which can switch a first read mode for dividing signals of photoelectric conversion pixels from the image sensor into m fields (m is a natural number not less than 3) by interlaced scan, and reading signals for the m fields, and a second read mode for reading signals for n fields (n is a natural number that meets $2 \leq n < m$) of the m fields from the image sensor, and in that when signals of photoelectric conversion pixels are read in the second read mode, the signals of photoelectric conversion pixels are added to signals of photoelectric conversion pixels of the same colors in a field other than the n fields and are read by an interlaced operation.

According to the third aspect of the present invention, a method of controlling an image capturing apparatus is directed to a method of controlling an image capturing apparatus, which has an image sensor which comprises a plurality of photoelectric conversion pixels arranged in a two-dimensional matrix in vertical and horizontal directions, and a common output unit which is commonly provided to the plurality of photoelectric conversion pixels to sequentially output signals from the plurality of photoelectric conversion pixels, characterized by comprising: a step of switching a first read mode for dividing signals of photoelectric conversion pixels from the image sensor into m fields (m is a natural number not less than 3) by interlaced scan, and reading signals for the m fields, and a second read mode for reading signals for n fields (n is a natural number that meets $2 \leq n < m$) of the m fields from the image sensor.

According to the fourth aspect of the present invention, a method of controlling an image capturing apparatus is directed to a method of controlling an image capturing apparatus, which has an image sensor which comprises a plurality of photoelectric conversion pixels arranged in a two-dimensional matrix in vertical and horizontal directions, and a common output unit which is commonly provided to the plurality of photoelectric conversion pixels to sequentially output signals from the plurality of photoelectric conversion pixels, characterized by comprising: a step of switching a first read mode for dividing signals of photoelectric conversion pixels from the image sensor into m fields (m is a natural number not less than 3) by interlaced scan, and reading signals for the m fields, and a second read mode for reading signals for n fields (n is a natural number that meets 2≦n<m) of the m fields from the image sensor; and a step of adding, when signals of photoelectric conversion pixels are read in the second read mode, the signals of photoelectric conversion pixels to signals of photoelectric conversion pixels of the same colors in a field other than the n fields and reading the added signals of photoelectric conversion pixels by an interlaced operation.

According to the fifth aspect of the present invention, a program is characterized by making a computer execute the aforementioned control method.

According to the sixth aspect of the present invention, a storage medium is characterized by computer-readably storing the aforementioned program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail in accordance with the accompanying drawings.

First Embodiment

Figure 1:
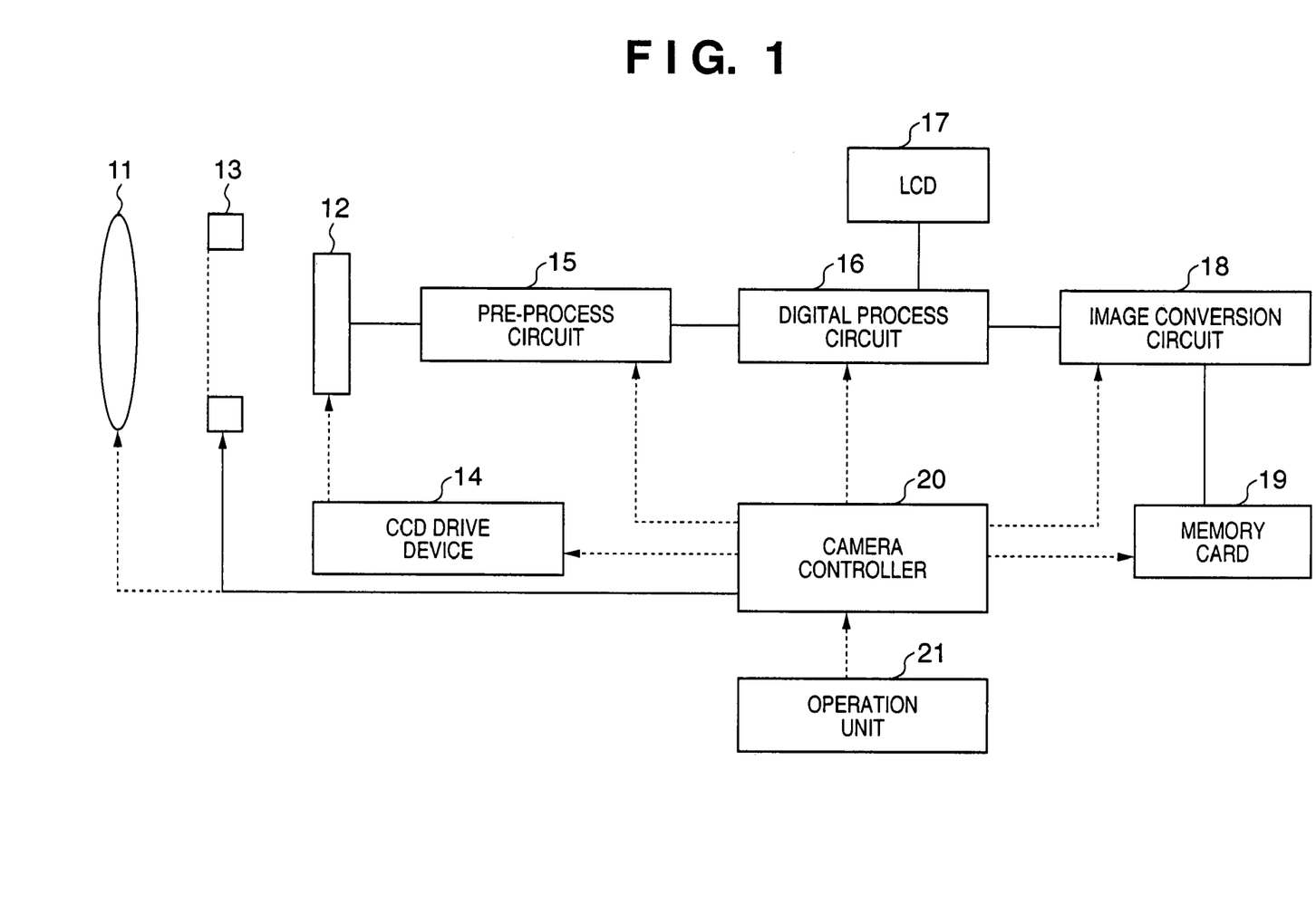
FIG. 1 is a schematic block diagram showing the arrangement of a digital still camera according to the first embodiment of the present invention.

FIG. 1 is a schematic block diagram showing the arrangement of a digital still camera according to the first embodiment of the present invention.

An optical system 11 including lenses and the like forms an object image on the light-receiving surface of a CCD 12. The CCD 12 is an image sensor which photoelectrically converts an optical signal of the object formed on its light-receiving surface and generates an electrical signal. A mechanical shutter 13 is arranged between the optical system 11 and CCD 12. By closing this mechanical shutter 13, light that enters the CCD 12 can be intercepted.

The output from the CCD 12, which is driven by a CCD drive device 14 that generates CCD drive timing pulses, is digitized by a pre-process circuit 15 which includes a sample & hold (S/H) circuit, gain amplifier, and analog-to-digital (A/D) converter, and the digital signal is input to a digital process circuit 16. The digital process circuit 16 applies various digital signal processes such as a gamma process, color signal process, and the like. The output from the digital process circuit 16 can also be output via an LCD display 17.

Image data that has undergone the image processes of the digital process circuit 16 is compressed via an image conversion circuit 18, and is written in and recorded on a memory card 19. The image conversion circuit 18 has a function of compressing image data from the digital process circuit 16 and outputting it to the memory card 19, and a function of decompressing image data read out from the memory card 19, and outputting it to the digital process circuit 16.

The optical system 11, mechanical shutter 13, CCD drive device 14, pre-process circuit 15, digital process circuit 16, image conversion circuit 18, and memory card 19 are respectively controlled by a camera controller 20. To this camera controller 20, an operation unit 21 having a release function, an output image size switching function, a read mode switching function, and the like is connected. With this read mode switching function, the digital still camera of this embodiment can select a first read mode and second read mode.

Note that the first read mode is a mode of exposing for an arbitrary time period, and reading all m fields (m is a natural number equal to or larger than 3) after the mechanical shutter is closed upon capturing a still image when a frame read process for reading out all pixels by dividing an interline type image sensor into m fields by interlaced scan. Also, the second read mode is a mode of reading n arbitrary fields (n: a natural number that meets n<m) of the m fields after the mechanical shutter is closed so as to shorten the transfer time of pixel information. Then, a still image is generated from obtained field images.

Figure 2:
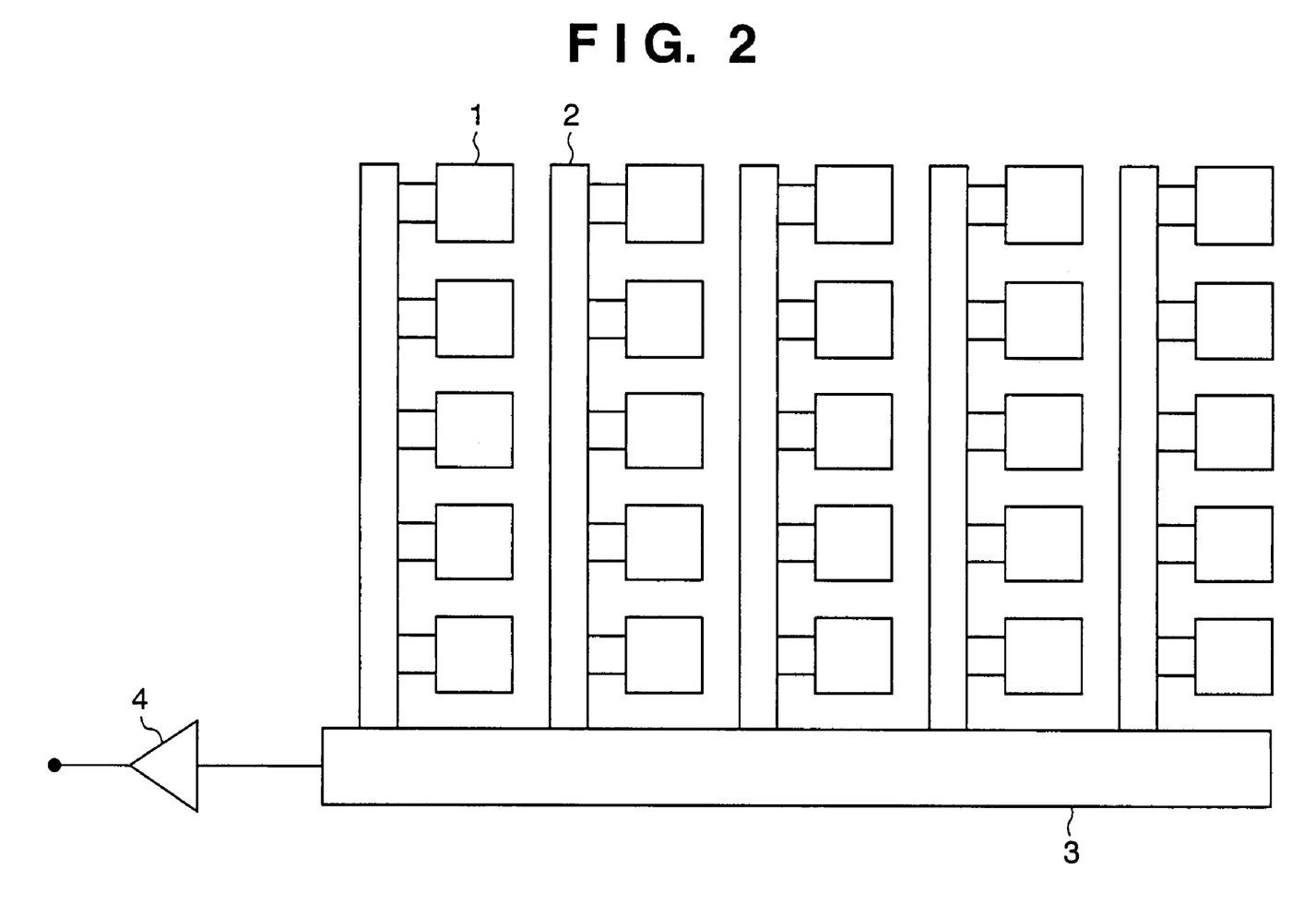
FIG. 2 is a schematic diagram showing the internal arrangement of a CCD shown in FIG. 1.

The arrangement of the interline type CCD 12 used in the digital still camera of this embodiment will be described below. FIG. 2 shows the arrangement of the interline type CCD 12.

The CCD 12 is an interline type solid-state image sensor, and comprises photoelectric conversion elements (pixels) 1 which are arranged in a matrix and convert incoming light into charges, vertical transfer units (VCCD) 2 which read signal charges accumulated on these pixels and transfer them vertically, a horizontal transfer unit (HCCD) 3 which transfers signal charges for one line transferred from each of these vertical transfer unit 2 in the horizontal direction, and an output amplifier 4 which converts signal charges transferred from the horizontal transfer unit 3 into an electrical signal.

Upon capturing a still image by the digital still camera of this embodiment, the mechanical shutter 13 is closed a predetermined exposure time after release, and respective pixels 1 accumulate charges in amounts corresponding to the amount of object light. After that, the pixel charges are divided into m fields, are read to the vertical transfer units 2, and are transferred via the vertical transfer units 2 and horizontal transfer unit 3.

A high-speed sweep period is assured before pixels of respective fields are read, thus removing residual smear components and the like on the vertical transfer units 2. The presence of this high-speed sweep period is also a characteristic feature of still image capture of this embodiment with respect to moving image capture that successively reading out pixels without high-speed sweep.

Figure 3:
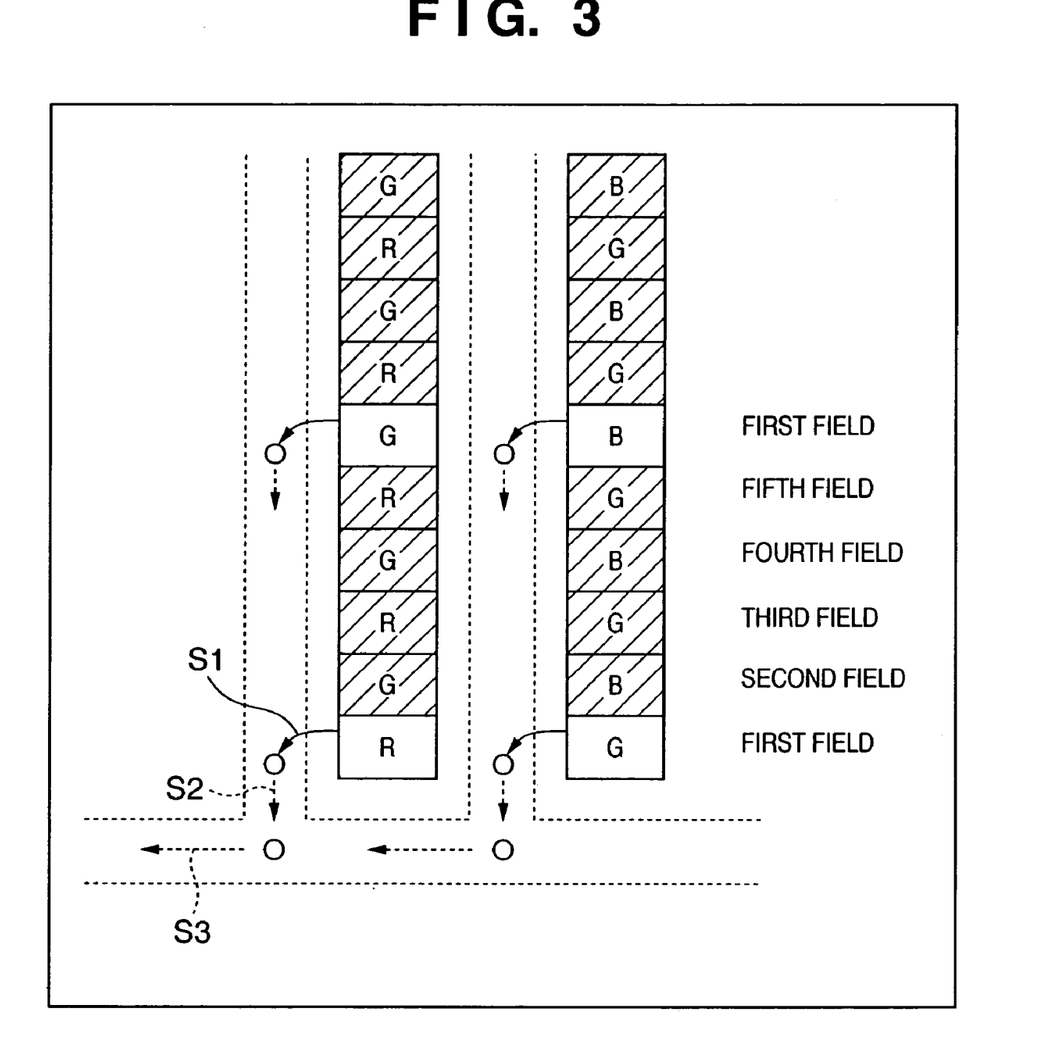
FIG. 3 shows a CCD pixel matrix indicating the operation of a first read mode in the first embodiment.

FIG. 3 partially shows a pixel layout. This embodiment assumes 3,200 (H) columns×2,400 (V) lines pixels, and a 5-field read process. A filter matrix will be explained as a so-called Bayer matrix which includes RG lines in which R (red) and G (green) pixels alternately line up in the horizontal direction, and GB lines in which G (green) and B (blue) pixels alternately line up in the horizontal direction.

A method of transferring charges in the first read mode for reading all m fields (=5 fields), which has already been plainly described, will be described below with reference to FIGS. 3 and 4.

Figure 4:
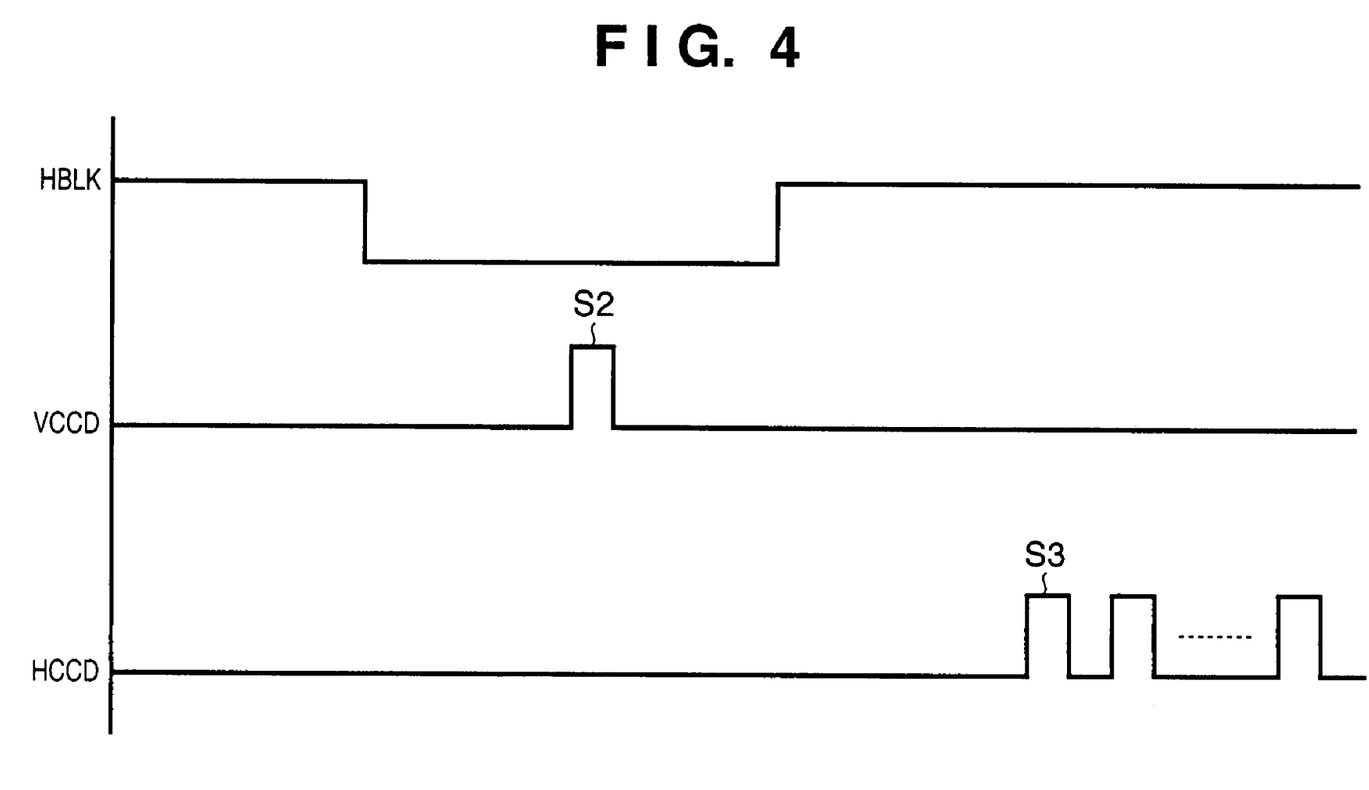
FIG. 4 is a timing chart showing the operation of the first read mode in the first embodiment.

FIG. 4 illustrates timing pulses of drive voltages for charge transfer, which are applied to the transfer gate electrodes of the vertical transfer units (VCCD) 2 and horizontal transfer unit (HCCD) 3 during and after a horizontal blanking period (HBLK). These timing pulses are supplied from the CCD drive device 14 to drive the CCD 12.

After the mechanical shutter is closed and the high-speed sweep period elapses, signal charges of pixels in the first field are read out to the vertical transfer units (S1).

After that, when the horizontal blanking period starts, one or a plurality of stages of the vertical transfer units 2 are driven by applying pulse voltages to the transfer gate electrodes of the vertical transfer units 2 to transfer charges read from pixels in one horizontal line closest to the horizontal transfer unit 3 to the horizontal transfer unit 3 (S2).

During from when an effective period starts until the valid period ends after the horizontal blanking period has elapsed, a large number of pulse voltages to the gate electrode of the horizontal transfer unit 3 to transfer charges for 3,200 stages (for 3,200 columns) of the horizontal transfer unit 3 (S3) and to output them from the output amplifier 4.

By repeating the same operation every 480 horizontal blanking periods (since pixels for 2,400 lines are divisionally read in five fields, the number of lines per field period is 2,400/5=480 lines), read processes of 3,200×480=1,536,000 accumulated charges are completed, and all signal charges of pixels in the first field have been read.

Subsequently, upon completion of another high-speed sweep period, signal charges of pixels of the second field are read to the vertical transfer units, and all the signal charges of pixels of the second field are read by the same transfer method as in the first field.

Likewise, signal charges of pixels of the third to fifth fields are read, and signal charges of all pixels (3,200×480×5=7,680,000) are acquired.

The read pixels are processed by the digital process circuit 16 via the pre-process circuit 15. In this case, the data for the five fields are combined, and are arranged in corresponding lines to finally obtain an image with a size of 3,200 H×2,400 V.

Figure 5:
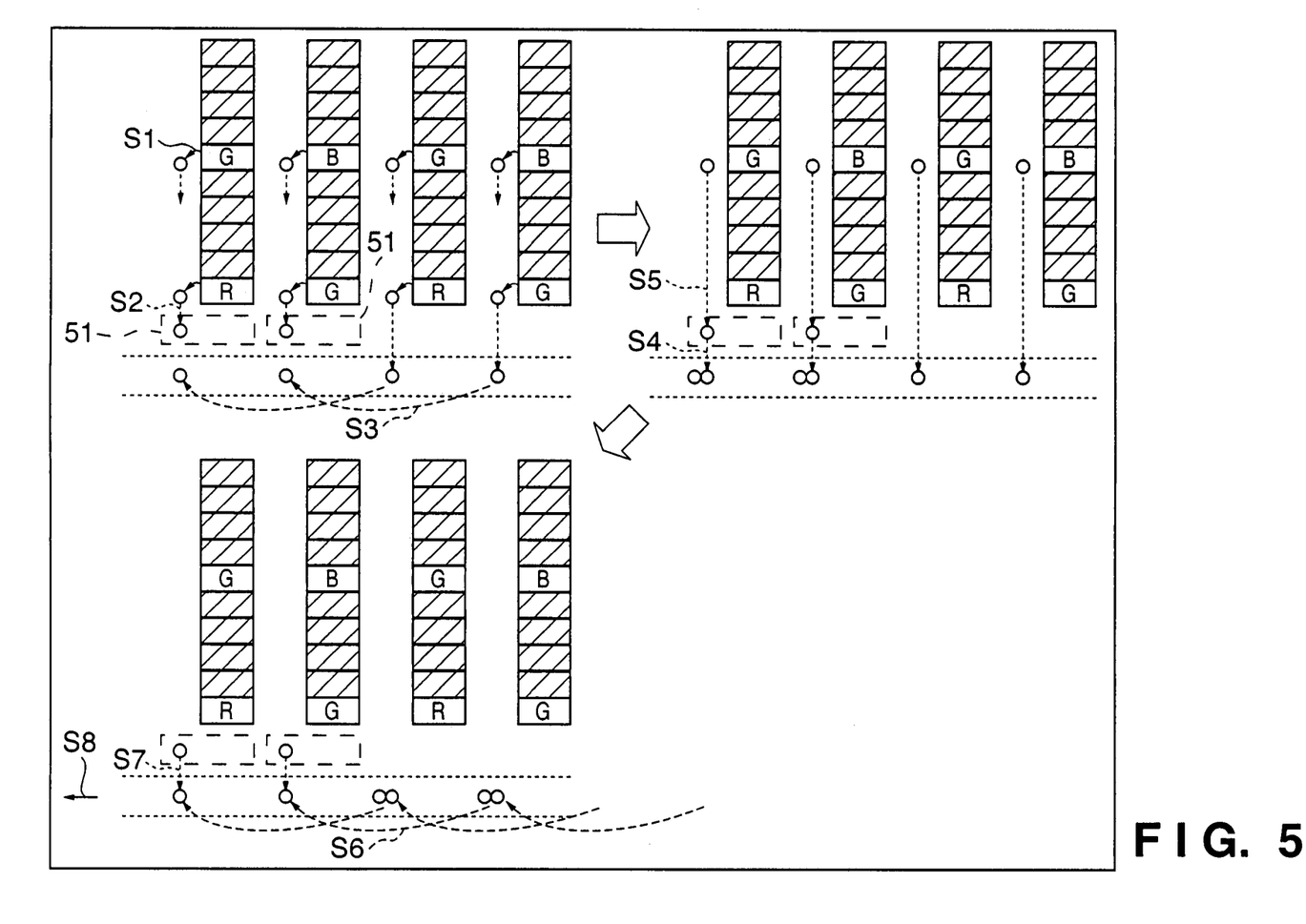
FIG. 5 shows a CCD pixel matrix indicating the operation of a second read mode in the first embodiment.
Figure 6:
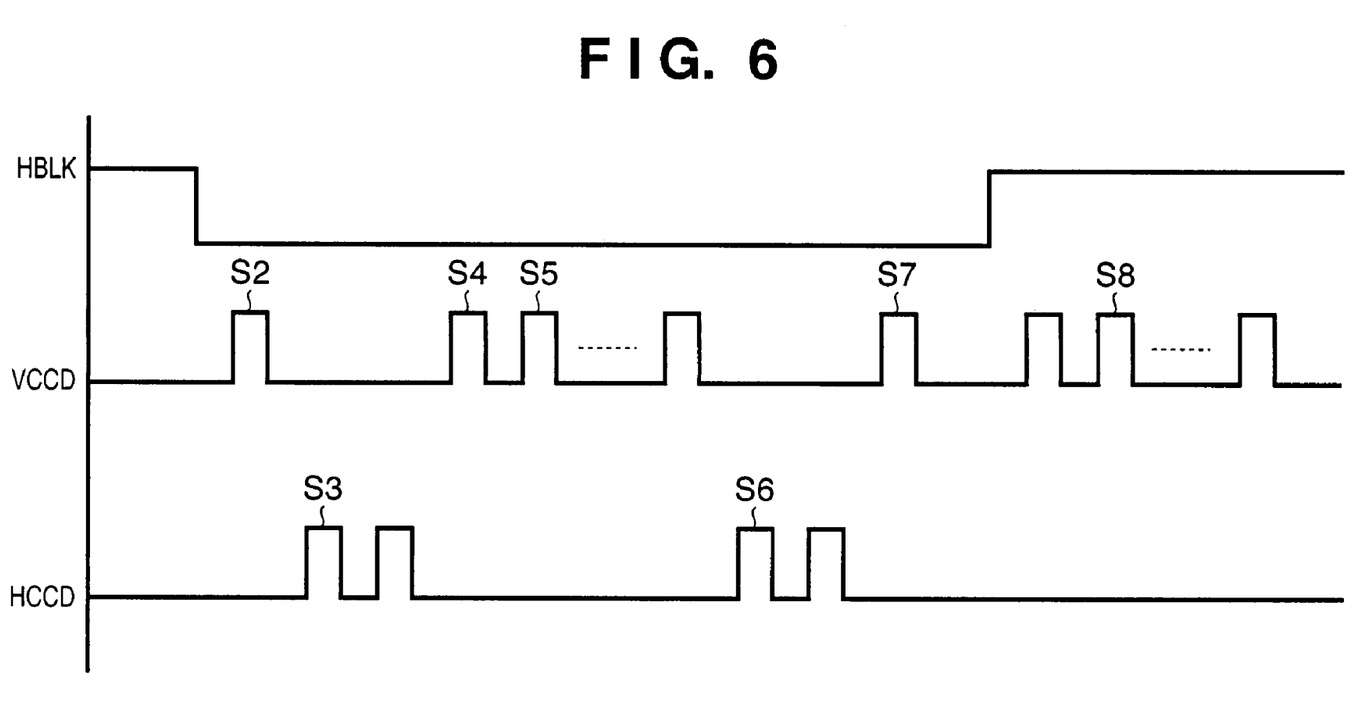
FIG. 6 is a timing chart showing the operation of the second read mode in the first embodiment.

A method of transferring charges in the second read mode which reads only n out of m fields, which has already been plainly described, will be described below with reference to FIGS. 5 and 6. FIGS. 5 and 6 respectively show a part of a pixel matrix, and timing pulses as in FIGS. 3 and 4. In the vertical transfer units, columns including accumulation areas 51 and those which do not include them alternately line up every two columns.

In this embodiment, only two (the first and fourth fields) out of five fields are to be read.

After the mechanical shutter is closed and the high-speed sweep period elapses, signal charges of pixels in the first field are read out to the vertical transfer units (S1).

After that, when the horizontal blanking period starts, one or a plurality of stages of the vertical transfer units 2 are driven by applying pulse voltages to the transfer gate electrodes of the vertical transfer units 2 to transfer charges read from pixels in one horizontal line closest to the horizontal transfer unit 3 from columns that do not include accumulation areas 51 to the horizontal transfer unit 3 and from columns which include them to the accumulation areas 51 (S2).

Two pulse voltages are applied to the transfer gate electrode of the horizontal transfer unit 3 to transfer pixels in the horizontal transfer unit 3 by two stages in the horizontal direction (S3).

Subsequently, pulse voltages are applied to the transfer gate electrodes of the vertical transfer units 2 to drive the vertical transfer units 2 by one stage, thus mixing charges of the accumulation areas 51 with those of the horizontal transfer unit (S4).

Next, charges read from pixels of one horizontal line second closest to the horizontal transfer unit 3 are transferred from columns which do not include the accumulation areas 51 to the horizontal transfer unit 3 and from columns which include them to the accumulation areas 51 (S5).

Two pulse voltages are applied to the transfer gate electrode of the horizontal transfer unit 3 to transfer pixels in the horizontal transfer unit 3 by two stages in the horizontal direction (S6).

Charges read from pixels of one horizontal line second closest to the horizontal transfer unit 3 are transferred from columns which do not include the accumulation areas 51 to the horizontal transfer unit 3 and from columns which include them to the accumulation areas 51 (S7).

With the processes executed so far, signal charges for a total of two lines are stored in one line (horizontal transfer unit 3) while being horizontally added.

During the time from when an effective period starts until the valid period ends after the horizontal blanking period has elapsed, a large number of pulse voltages to the gate electrode of the horizontal transfer unit 3 to transfer charges for 3,200 stages of the horizontal transfer unit 3 (S8) and to output them from the output amplifier 4.

With this process, signal charges for two lines which are horizontally added can be read within one horizontal period.

By repeating the same operation every 240 horizontal blanking periods corresponding to half of those per field period, read processes of 1,600×2×240=768,000 accumulated charges are completed, and signal charges of pixels in the first field are halved by horizontal addition and are read at a double speed. In addition, since two pixels are horizontally added, the sensitivity is nearly doubled.

Subsequently, upon completion of another high-speed sweep period, signal charges of pixels of the fourth field are read to the vertical transfer units, and the signal charges of pixels of the fourth field are read at a double speed by the same transfer method as in the first field.

With the aforementioned transfer method, 1,600×480×2=1,536,000 pixels are acquired.

The read pixels are processed by the digital process circuit 16 via the pre-process circuit 15. In this case, the data for the two fields are combined, and are arranged in corresponding lines to finally obtain an image with a size of 1,600 H×960 V.

In this way, when the second read mode of this embodiment is used (FIG. 7B), the time required for pixel signal transfer to obtain an image can be reduced to ⅕ compared to that required upon reading all the five fields (FIG. 7A), thus remarkably improving the frame rate. In addition, an image which has a final pixel size ⅕ and doubled sensitivity can be obtained.

Furthermore, this read mode need not always be switched in response to the read mode switching signal in the operation unit 21. For example, in response to an output image size switching operation, the camera controller 20 may automatically determine which of read modes is preferable, and may switch the read mode.

As a result, the user can take a picture at a maximum frame rate in correspondence with the required number of pixels irrespective of the read mode of CCD pixels in the camera.

A signal processing function that sets an assumed saturated signal amount to be higher than that upon reading all m field when n arbitrary fields are read will be explained.

When light with a given luminance level or higher enters the CCD, an output signal is saturated. However, it is not preferable that the saturated region of the CCD output becomes lower than the MAX value of a camera output image. For example, in an output image expressed by 8 bits per pixel, the saturated region does not reach 255LSB (least significant bit) as a normal value but hits the peak at 254LSB or 253LSB.

For this reason, upon executing a signal process of the CCD output, an image process must be done using only a portion before the saturated region is reached as an effective region of the CCD output. For this purpose, a method that sets a MIN gain value by the gain amplifier, and raises the saturated region of the CCD to be higher than MAX of the signal processing region is effective. In the digital still camera of this embodiment, the pre-process circuit 15 including the gain amplifier in FIG. 1 plays that role, and the camera controller 20 sets the MIN gain value calculated from the saturation signal of the CCD in the gain amplifier.

After the CCD completes exposure for a desired exposure time, and the mechanical shutter is closed, the charge amount (so-called saturation signal amount) accumulated on the CCD decreases along with an elapse of time.

Figure 8:
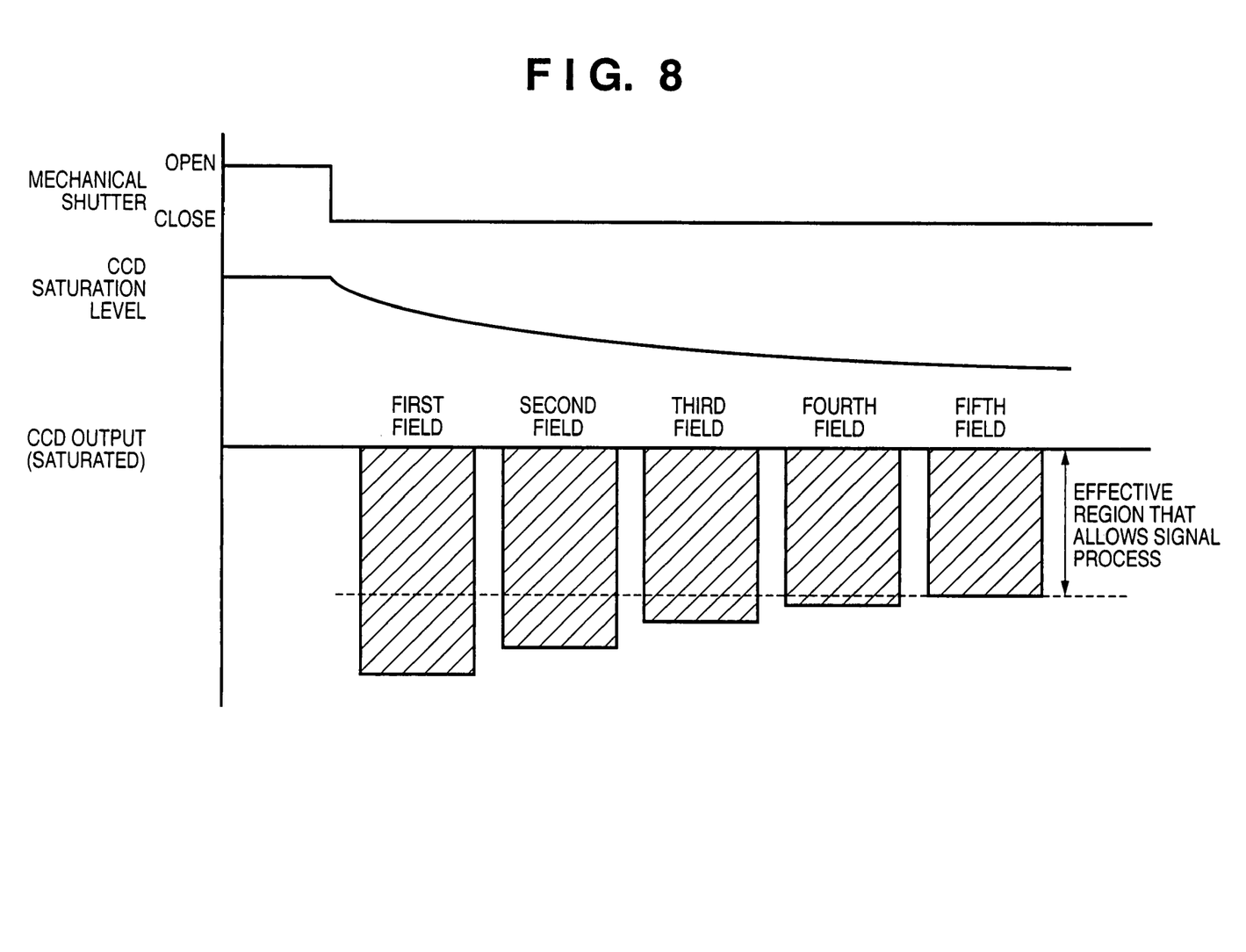
FIG. 8 is a schematic view showing transition of a saturated signal amount until the CCD output is read.

For this reason, as shown in FIG. 8, respective fields having different read times of CCD outputs have different saturated signal amounts.

Hence, the MIN gain value of the gain amplifier which is applied to skip the signal process of the saturated region of the CCD must be determined in accordance with the saturated signal amount of the field to be read lastly.

Figure 7A:
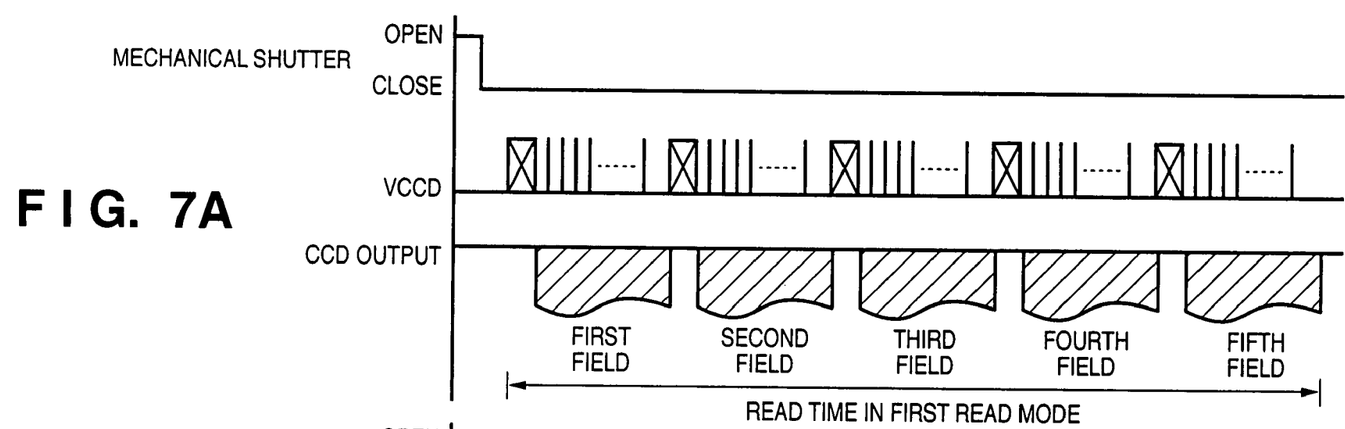
FIGS. 7A and 7B are schematic views showing the read times in the second read mode in the first embodiment.
Figure 7B:
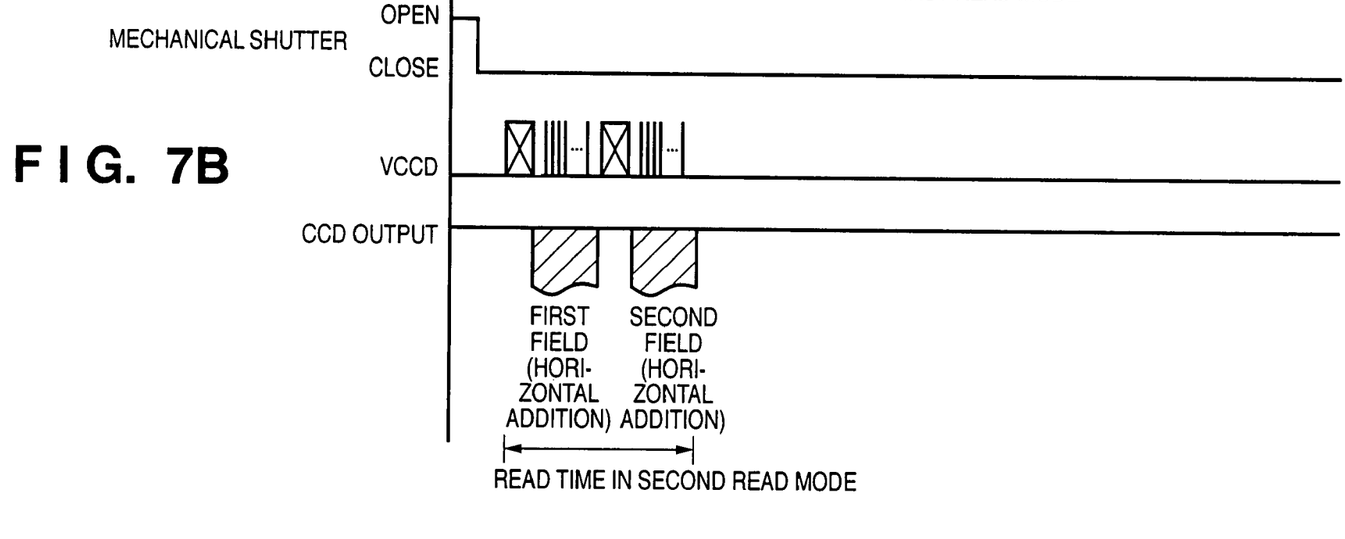

In the second read mode of this embodiment, as shown in FIGS. 7A and 7B, the number of fields to be read is smaller than that in a normal still image capture mode (first read mode), and the read time is greatly shorter since the horizontal addition read mode is used.

For this reason, the saturated signal amount of the field to be read lastly becomes relatively large. Hence, in the second read mode, the MIN gain value of the gain amplifier can be set to be lower than the normal read mode.

The small gain value of the gain amplifier means that upon gain up deterioration of the S/N characteristics can be suppressed, and the S/N characteristics of an output image improves.

As described above, with the signal processing function in which the camera controller 20 changes settings of the CCD saturated signal amount in accordance with the read mode and changes the MIN gain value of the gain amplifier, an output image with high S/N characteristics can be generated.

A function of determining positions of read fields on all pixels upon reading n arbitrary fields, and generating a still image by an interpolation process even when the fields are not equally spaced will be explained below.

Figure 9:
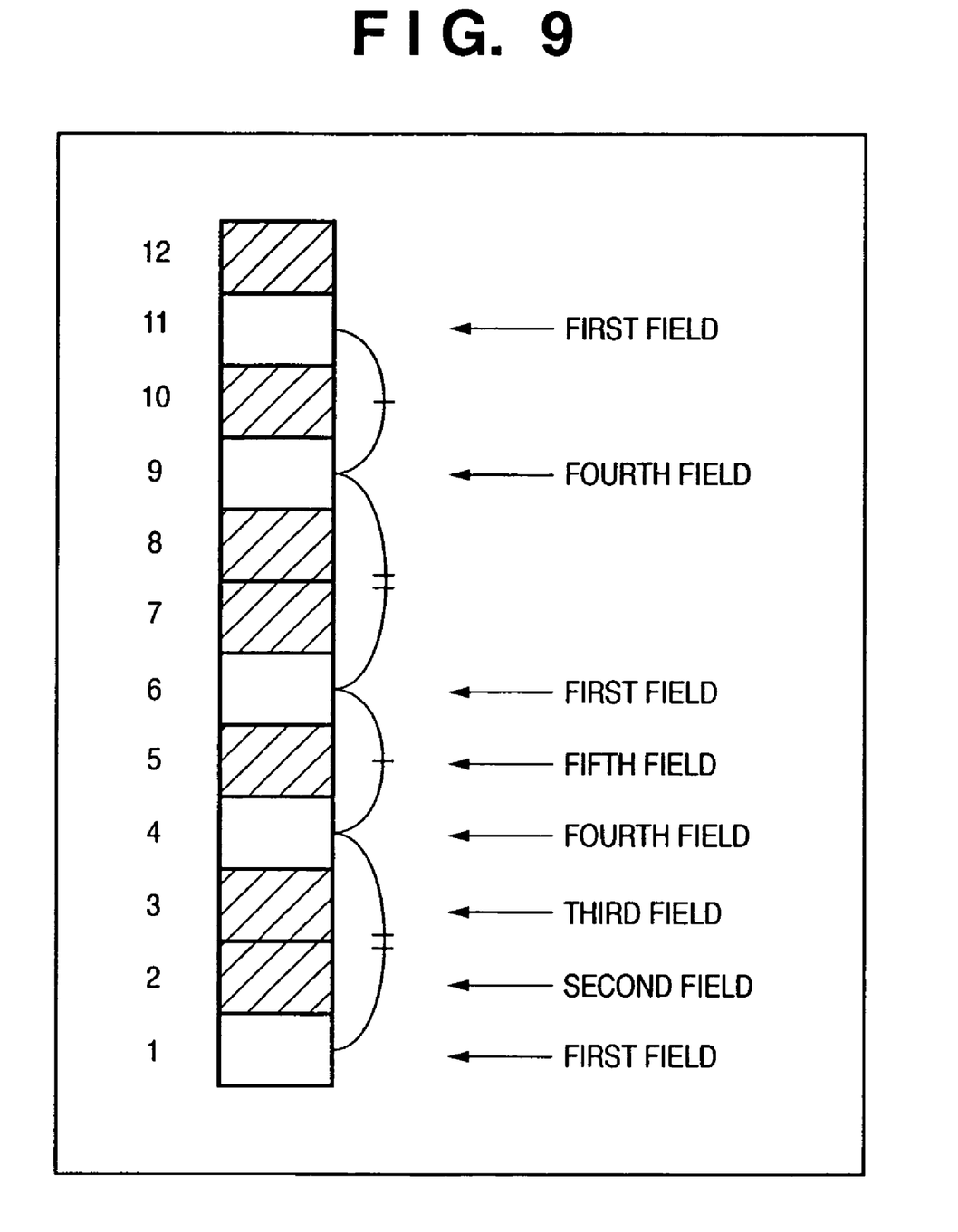
FIG. 9 is a schematic view showing the layout of read pixels in the vertical direction.

When the second read mode of this embodiment is executed in the aforementioned pattern, read pixels form a vertical layout, as shown in FIG. 9, and the pixel positions are not always equally spaced depending on the read method.

Hence, the digital still camera of this embodiment has a function of changing the signal process of the digital process circuit 16 to an interpolation process mode in response to a control signal from the camera controller 20.

In the interpolation process mode, an interpolation process is applied to read pixel information in accordance with the actual layout, so that even when a signal of a pixel layout which is not equally spaced can be processed.

Even when respective fields are not equally spaced, a still image is generated by the interpolation process. Hence, an image can be reconstructed more accurately than the processes for equal intervals.

Second Embodiment

A digital still camera according to the second embodiment of the present invention will be described below.

The second embodiment has the same arrangement and process as those of the digital still camera of the first embodiment. In addition, the second embodiment has a vertical addition function. The vertical addition function will be described below with reference to FIGS. 10 and 11.

Figure 10:
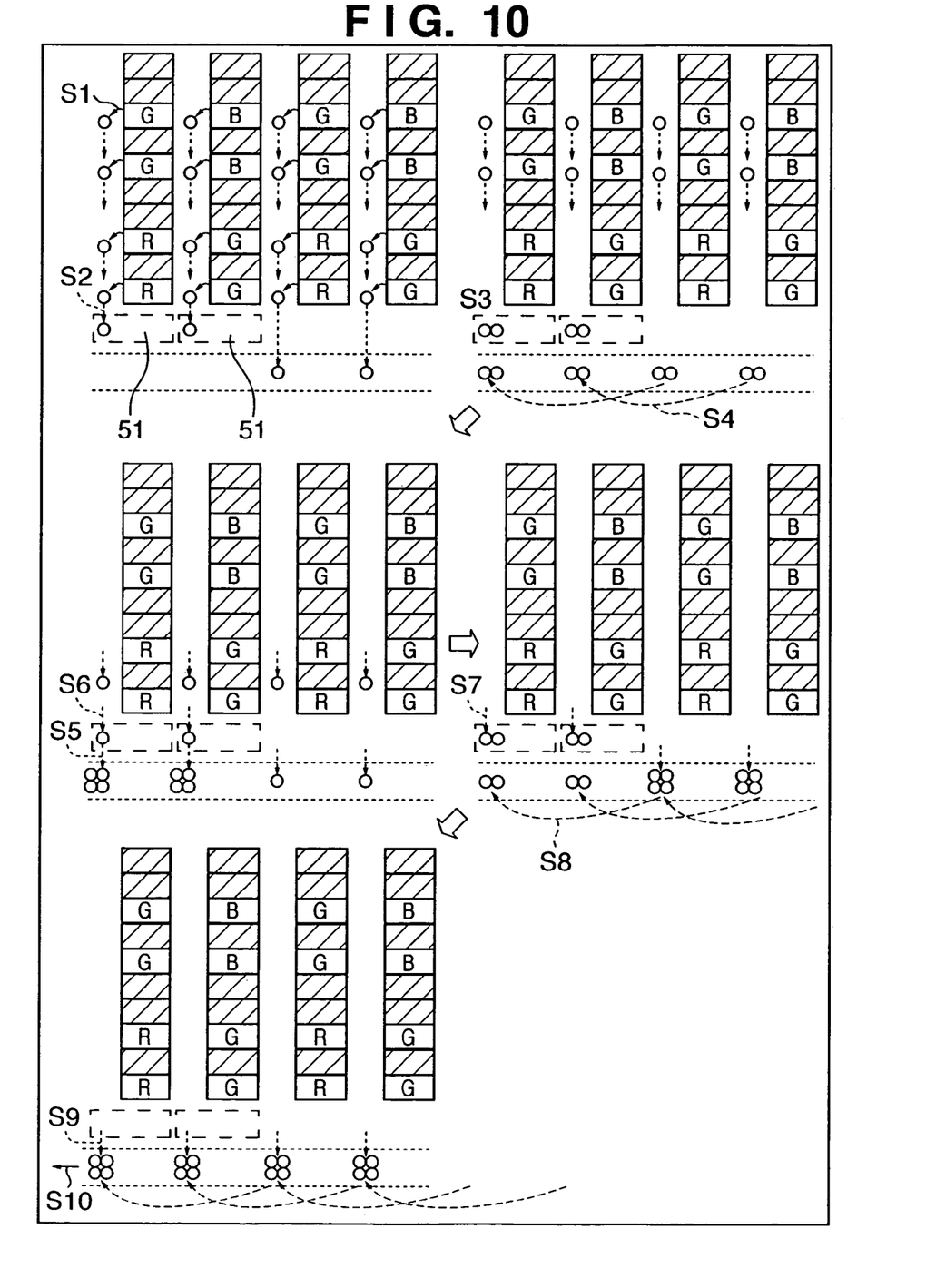
FIG. 10 shows a CCD pixel matrix indicating the operation of a second read mode in the second embodiment.
Figure 11:
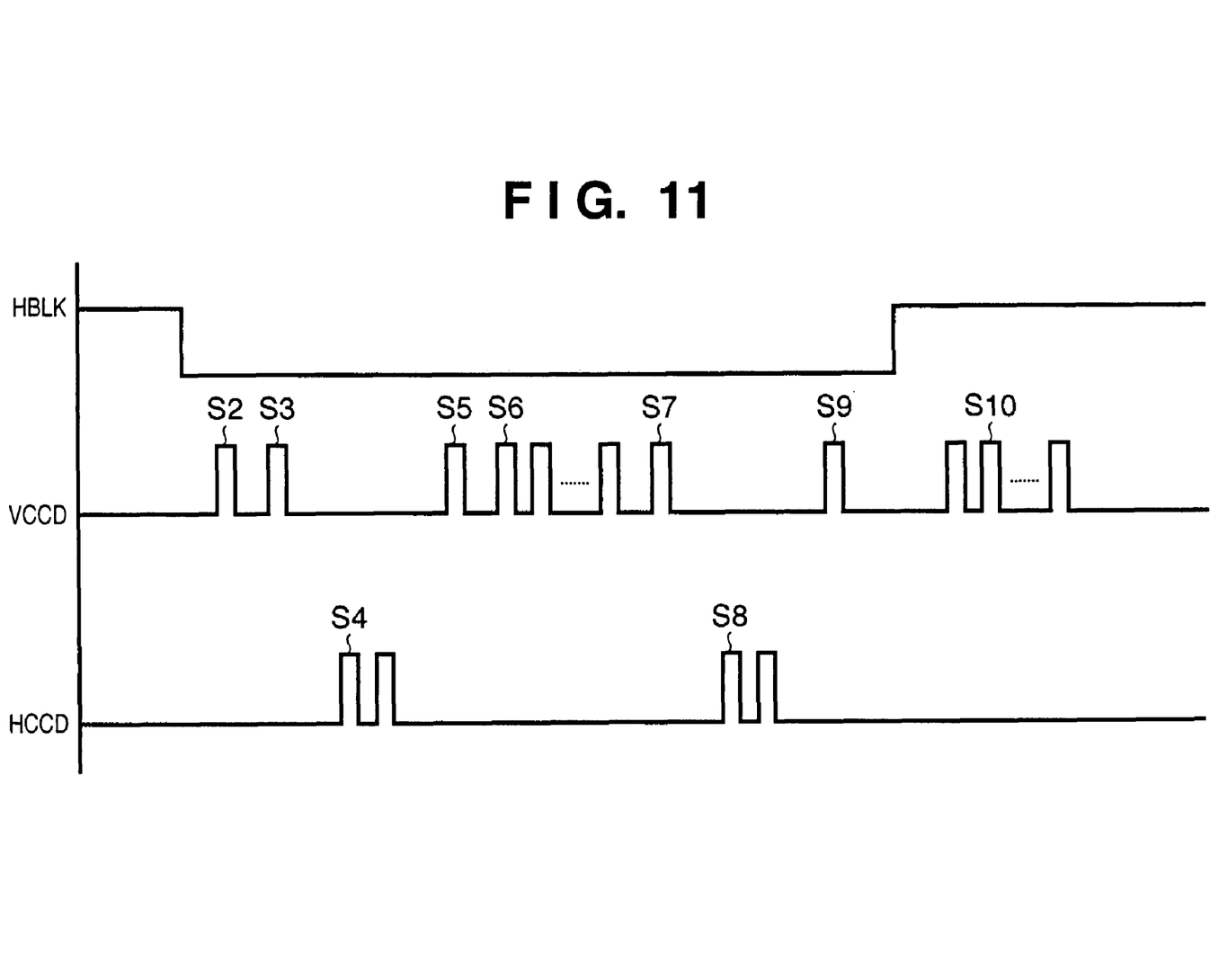
FIG. 11 is a timing chart showing the operation of the second read mode in the second embodiment.

FIGS. 10 and 11 respectively show a part of a pixel matrix and timing pulses as in FIGS. 3 and 4. In the vertical transfer units, columns including accumulation areas 51 and those which do not include them alternately line up every two columns.

In this embodiment, only two (the first and fourth fields) out of five fields are to be read.

After the mechanical shutter is closed and the high-speed sweep period elapses, signal charges of pixels in the first field are read out to the vertical transfer units. At this time, pixels of the third field which are not scheduled to be read are simultaneously transferred to the vertical transfer unit (S1).

After that, when the horizontal blanking period starts, one or a plurality of stages of the vertical transfer units 2 are driven by applying pulse voltages to the transfer gate electrodes of the vertical transfer units 2 to transfer charges read from pixels in one horizontal line closest to the horizontal transfer unit 3 from columns that do not include accumulation areas 51 to the horizontal transfer unit 3 and from columns which include them to the accumulation areas 51 (S2).

While the horizontal transfer unit 3 is kept intact, the pulse voltages are further applied to the transfer gate electrodes of the vertical transfer unit 2 to mix read charges of one line that neighbors the line that has undergone transfer in (S2) in the accumulation areas 51 and horizontal transfer unit 3 (S3). As a result, vertical addition is done.

Two pulse voltages are applied to the transfer gate electrode of the horizontal transfer unit 3 to transfer pixels in the horizontal transfer unit 3 by two stages in the horizontal direction (S4).

Subsequently, pulse voltages are applied to the transfer gate electrodes of the vertical transfer units 2 to drive the vertical transfer units 2 by one stage, thus mixing charges of the accumulation areas 51 with those of the horizontal transfer unit (S5).

Next, charges read from pixels of one horizontal line second closest to the horizontal transfer unit 3 are transferred from columns which do not include the accumulation areas 51 to the horizontal transfer unit 3 and from columns which include them to the accumulation areas 51 (S6).

While the horizontal transfer unit 3 is kept intact, the pulse voltages are further applied to the transfer gate electrodes of the vertical transfer unit 2 to mix read charges of one line that neighbors the line that has undergone transfer in (S6) in the accumulation areas 51 and horizontal transfer unit 3 (S7). As a result, another vertical addition is done.

Two pulse voltages are applied to the transfer gate electrode of the horizontal transfer unit 3 to transfer pixels in the horizontal transfer unit 3 by two stages in the horizontal direction (S8).

Subsequently, pulse voltages are applied to the transfer gate electrodes of the vertical transfer units 2 to drive the vertical transfer units 2 by one stage, thus mixing charges of the accumulation areas 51 with those of the horizontal transfer unit (S9).

With the processes executed so far, signal charges for a total of two lines are stored in one line horizontal transfer unit 3) while being vertically and horizontally added.

During the time from when an effective period starts until the valid period ends after the horizontal blanking period has elapsed, a large number of pulse voltages to the gate electrode of the horizontal transfer unit 3 to transfer charges for 3,200 stages of the horizontal transfer unit 3 (S10) and to output them from the output amplifier 4.

With this process, signal charges for two lines which are vertically and horizontally added can be read within one horizontal period.

By repeating the same operation every 240 horizontal blanking periods corresponding to half of those per field period, read processes of 1,600×2×240=768,000 accumulated charges are completed, and signal charges of pixels in the first field+third field are halved by horizontal addition and are read at a double speed. In addition, since a total of four pixels are added vertically/horizontally, the sensitivity becomes nearly 4 times.

Subsequently, upon completion of another high-speed sweep period, signal charges of pixels of the fourth field and those of pixels of the second field which is not scheduled to read are read to the vertical transfer units, and the signal charges of pixels of the fourth field+second field are read at a double speed by the same transfer method as in the first field.

With the aforementioned transfer method, 1,600×480×2=1,536,000 pixels are acquired.

The read pixels are processed by the digital process circuit 16 via the pre-process circuit 15. In this case, the data for the two fields are combined, and are arranged in corresponding lines to finally obtain an image with a size of 1,600 H×960 V.

In this way, when the second read mode and vertical addition function of this embodiment are used, the time required for pixel signal transfer to obtain an image can be reduced to ⅕ compared to that required upon reading all the five fields, thus remarkably improving the frame rate. In addition, an image which has a final pixel size ⅕ and quadruple sensitivity can be obtained.

As described above, according to the above embodiments, in the read mode that reads only n arbitrary fields of m fields, the pixel transfer time can be shortened to n/m. That is, if the required number of pixels is met, the pixel transfer time can be reduced to n/m, and the frame rate improves remarkably.

Furthermore, the horizontal pixel addition function can further reduce the transfer time to ½. That is, if the required number of pixels is met, the pixel transfer time can be reduced to n/2m, and the frame rate improves remarkably.

When the read mode is automatically selected in correspondence with the required number of pixels, a maximum frame rate can be realized in correspondence with the required number of pixels without user's recognition.

By adding pixels of a field which is not read to those of the field to be read, the sensitivity improves in addition to improvement of the frame rate.

Since a saturated signal amount is set to be higher than that upon reading all m fields when n arbitrary fields are read, a low MIN gain value of the next gain amplifier can be set. Hence, an image with high S/N characteristics can be obtained.

Upon reading n arbitrary fields, since the positions of read fields on all pixels are checked, and a still image is generated by an interpolation process even when respective fields are not equally spaced, an image can be reconstructed more accurately than the processes for equal intervals.

As described above, when the image capturing apparatus captures a still image, the number of pixels to be read from the image sensor can be reduced in correspondence with the required image size, and the time required to capture an image can be shortened.

Other Embodiments

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit. When the present invention is applied to the storage medium, that storage medium stores the program codes corresponding to the aforementioned flow charts.

When the present invention is applied to the storage medium, that storage medium stores program codes corresponding to the aforementioned sequence.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-024486 filed on Jan. 30, 2004, which is hereby incorporated by reference herein.

What is claimed is:

1. An image capturing apparatus comprising:
an image sensor which comprises a plurality of photoelectric conversion pixels arranged in a two-dimensional matrix in vertical and horizontal directions, and a common output unit which is commonly provided to the plurality of photoelectric conversion pixels to sequentially output signals from the plurality of photoelectric conversion pixels;

a read unit adapted to read out the signals from said image sensor by dividing the signals of the plurality of photoelectric conversion pixels into m fields, m is a natural number not less than 3;

a mode setting unit adapted to set a first read mode or a second read mode, wherein the first read mode is for reading out the signals for the m fields from said image sensor, and the second read mode is for reading out the signals for n fields of the m fields from said image sensor, n is a natural number that meets $2 \leq n < m$;

a vertical addition unit adapted to simultaneously read out the signals of one field of the n fields and the signals of another field other than the n fields, and to add the read out signals of the one field and the read out signals of the another field fields other than n fields in the vertical direction, when the second read mode is set by said mode setting unit; and a horizontal addition unit adapted to add the signals added by said vertical addition unit in the horizontal direction.

2. The apparatus according to claim 1, wherein said mode setting unit sets the read mode in accordance with the required number of pixels of an image to be captured.

3. The apparatus according to claim 2, wherein said mode setting unit automatically sets the read mode in accordance with the required number of pixels of an image to be captured.

4. The apparatus according to claim 1, further comprising a signal processing unit adapted to set an assumed saturation signal amount in the second read mode to be higher than a saturated signal amount required upon reading signals for the m fields in the first read mode.

5. The apparatus according to claim 1, further comprising an interpolation unit adapted to interpolate the signals when the pixel positions of the respective fields are not equally spaced in the second read mode.

6. The apparatus according to claim 1, wherein a read process starts by interlaced scan in both the first and second read modes after a shield unit shields said image sensor.

7. A method of controlling an image capturing apparatus, which has an image sensor which comprises a plurality of photoelectric conversion pixels arranged in a two-dimensional matrix in vertical and horizontal directions, and a common output unit which is commonly provided to the plurality of photoelectric conversion pixels to sequentially output signals from the plurality of photoelectric conversion pixels, comprising the step of:

reading out the signals from the image sensor by dividing the signals of the plurality of photoelectric conversion pixels into m fields, m is a natural number not less than 3;

setting a first read mode or a second read mode, wherein the first read mode is for reading out the signals for the m fields from the image sensor, and the second read mode is for reading out the signals for n fields of the m fields from the image sensor n is a natural number that meets $2 \leq n < m$;

simultaneously reading out the signals of one field of the n fields and the signals of another field fields other than the n fields, and adding the read out signals of the one field and the read out signals of the another field fields other than n fields in the vertical direction, when the second read mode is set by said setting step; and adding the signals added by said vertical addition step in the horizontal direction.

* * * * *